United States Patent
Zhong et al.

(10) Patent No.: US 10,474,935 B2
(45) Date of Patent: Nov. 12, 2019

(54) METHOD AND DEVICE FOR TARGET DETECTION

(71) Applicant: ZHEJIANG SHENGHUI LIGHTING CO., LTD, Jiaxing (CN)

(72) Inventors: Jinyan Zhong, Jiaxing (CN); Jinxiang Shen, Jiaxing (CN)

(73) Assignee: ZHEJIANG SHENGHUI LIGHTING CO., LTD., Jiaxing (CN)

( * ) Notice: Subject to any disclaimer, the term of this patent is extended or adjusted under 35 U.S.C. 154(b) by 44 days.

(21) Appl. No.: 15/749,724

(22) PCT Filed: Jan. 17, 2017

(86) PCT No.: PCT/CN2017/071368
§ 371 (c)(1),
(2) Date: Feb. 1, 2018

(87) PCT Pub. No.: WO2017/128990
PCT Pub. Date: Aug. 3, 2017

(65) Prior Publication Data
US 2018/0232607 A1  Aug. 16, 2018

(30) Foreign Application Priority Data
Jan. 25, 2016 (CN) .......................... 2016 1 0052607

(51) Int. Cl.
*G06K 9/68* (2006.01)
*G06K 9/32* (2006.01)
(Continued)

(52) U.S. Cl.
CPC ....... *G06K 9/6857* (2013.01); *G06K 9/00228* (2013.01); *G06K 9/3241* (2013.01); *G06K 9/4642* (2013.01); *G06T 2207/20* (2013.01)

(58) Field of Classification Search
CPC combination set(s) only.
See application file for complete search history.

(56) References Cited

U.S. PATENT DOCUMENTS 5,859,921 A * 1/1999 Suzuki ............... G06K 9/00268
382/118
6,404,455 B1 * 6/2002 Ito ..................... G08B 13/19602
348/169

(Continued)

FOREIGN PATENT DOCUMENTS

| CN | 105072320 A | 11/2015 |
|---|---|---|
| CN | 105117696 A | 12/2015 |
| CN | 105740792 A | 7/2016 |

OTHER PUBLICATIONS

The World Intellectual Property Organization (WIPO) International Search Report for PCT/CN2017/071368 dated Apr. 26, 2017 12 Pages.

*Primary Examiner* — Tsung Yin Tsai
(74) *Attorney, Agent, or Firm* — Anova Law Group, PLLC

(57) ABSTRACT

The present disclosure provides a method for target detection, including: obtaining an image captured by a camera, and zoning the image based on a mounting angle of the camera to obtain at least one image block; determining target-detection algorithms for the at least one image block based on positions of the at least one image block in the image; and performing target detection on the at least one image block based on the target-detection algorithms.

15 Claims, 4 Drawing Sheets

(51) Int. Cl.
*G06K 9/46* (2006.01)
*G06K 9/00* (2006.01)

(56) References Cited

U.S. PATENT DOCUMENTS

| | | | | |
|---|---|---|---|---|
| 7,634,113 | B2* | 12/2009 | Kim | G06K 9/00362 |
| | | | | 235/380 |
| 2006/0186651 | A1* | 8/2006 | Aoki | B60R 1/00 |
| | | | | 280/735 |
| 2006/0187305 | A1* | 8/2006 | Trivedi | G06K 9/00234 |
| | | | | 348/169 |
| 2007/0041638 | A1 | 2/2007 | Liu et al. | |
| 2008/0089556 | A1* | 4/2008 | Salgian | G06K 9/209 |
| | | | | 382/103 |
| 2008/0170754 | A1* | 7/2008 | Kawasaki | G06K 9/00805 |
| | | | | 382/104 |
| 2008/0253664 | A1* | 10/2008 | Li | G06K 9/00228 |
| | | | | 382/226 |
| 2008/0304705 | A1* | 12/2008 | Pomerleau | B60R 1/00 |
| | | | | 382/103 |
| 2010/0245576 | A1* | 9/2010 | Inui | G06T 7/80 |
| | | | | 348/148 |
| 2012/0219183 | A1* | 8/2012 | Mori | G06T 7/20 |
| | | | | 382/103 |
| 2014/0064556 | A1* | 3/2014 | Ohira | G06K 9/00671 |
| | | | | 382/103 |
| 2014/0119600 | A1* | 5/2014 | Maruyama | H04N 5/23219 |
| | | | | 382/103 |
| 2015/0016681 | A1* | 1/2015 | Fukata | G08G 1/165 |
| | | | | 382/103 |
| 2016/0042242 | A1* | 2/2016 | Segawa | G06T 7/593 |
| | | | | 382/103 |

* cited by examiner

METHOD AND DEVICE FOR TARGET DETECTION

CROSS-REFERENCES TO RELATED APPLICATIONS

This application is a national stage application under 35 USC § 371(c) of PCT Application No. PCT/CN2017/071368, filed on Jan. 17, 2017, which claims the priority of Chinese Patent Application No. 201610052607.3 filed on Jan. 25, 2016, the entire content of which is incorporated herein by reference.

FIELD OF THE DISCLOSURE

The present disclosure relates to the field of target detection technologies and, more particularly, relates to a method and a device for target detection.

BACKGROUND

Target detection technology is an important subject in the research field of computer vision. Target detection technology can be used to detect a specific target in a video, and is thus widely used in fields such as video surveillance, medical diagnosis, and intelligent transportation. In the field of video surveillance, target detection is often used for pedestrian detection. For example, the surveillance video may be detected frame by frame, to obtain information such as the existence of pedestrians and the number of pedestrians.

Conventional surveillance cameras are often mounted to be high up from the ground, and often have fixed mounting positions and fixed mounting angles. Also, the surveillance area of a conventional surveillance camera often is often filmed from a wide angle, causing the image of a corner area of the obtained video to be distorted. Accordingly, the target detection on a corner area is often considered invalid.

Conventional methods for target detection that are used in video surveillance, to ensure the accuracy of detection results, often apply high precision detection method on the entire image in a video. However, because of the large amount of data in a video, the target detection on the video often has low speed and relatively low efficiency.

The disclosed method and device are directed to solve one or more problems set forth above and other problems.

BRIEF SUMMARY OF THE DISCLOSURE

One aspect or embodiment of the present disclosure includes a method for target detection, including: obtaining an image captured by a camera, and zoning the image based on a mounting angle of the camera to obtain at least one image block; determining target-detection algorithms for the at least one image block based on positions of the at least one image block in the image; and performing target detection on the at least one image block based on the target-detection algorithms.

Optionally, determining target-detection algorithms for the at least one image block based on positions of the at least one image block in the image includes determining a target-detection algorithm for each one of the at least one image block based on a position of each one of the at least one image block in the image; and performing target detection on the at least one image block based on the target-detection algorithms includes performing a target detection on each one of the at least one image block based on the target-detection algorithm applied on each one of the at least one image block.

Optionally, zoning the image based on a mounting angle of the camera to obtain at least one image block includes: determining the mounting angle of the camera is within a preset range; and when mounting angle of the camera is within the preset range, zoning the image to three rectangular blocks from top to bottom of the image, the three rectangular blocks having a same length as the image and having a width ratio of about G:H:I from top to bottom of the image, G, H, and I being positive integers and I>H>G.

Optionally, the method further includes: determining whether the mounting angle of the camera is greater than a preset angle; and when the mounting angle of the camera is greater than the preset angle, zoning the image to three rectangular blocks from top to bottom of the image, the three rectangular blocks having a same length as the image and having a width ratio of about A:B:C from top to bottom of the image, A, B, and C being positive integers and B>C>A, and when the mounting angle of the camera is not greater than the preset angle, zoning the image to three rectangular blocks from top to bottom of the image, the three rectangular blocks having a same length as the image and having a width ratio of about D:E:F from top to bottom of the image, D, E, and F being positive integers and F>D>E.

Optionally, determining target-detection algorithms for the at least one image block based on positions of the at least one image block in the image includes: determining whether a distance between a geometric center of one of the at least one image block and a geometric center of the image is smaller than a preset distance; and when the distance is smaller than the preset distance, selecting a multi-scale and multi-cascade based target-detection algorithm on the one of the at least image block, and when the distance is greater than the preset distance, selecting a single-scale and single-cascade based target-detection algorithm on the one of the at least image block.

Optionally, the at least one image block is categorized to a plurality of types based on significance of the at least one image block such that a portion of one of the at least one image block is proportionally correlated to a significance of the one of the at least one image block.

Optionally, one of the at least one image blocks having a greatest portion in the width ratio is applied with a multi-scale and multi-cascade based target-detection algorithm having low speed and high precision; one of the at least one image block having a moderate portion in the width ratio is applied with a multi-scale based target-detection algorithm having large-window; and one of the at least one image block having a smallest portion in the width ratio is applied with a single-scale and single-cascade based target-detection algorithm having low precision and high speed.

Optionally, performing target detection on the at least one image block based on the target-detection algorithms includes: performing target detection on one of the at least one image block based on the target algorithm to obtain a detection result of at least one to-be-determined target; multiplying the detection result by a corresponding weight value to obtain a weighted detection result; and determining whether the weighted detection result is greater than a preset threshold value, when the weighted detection result is greater than the preset threshold value, determining the at least one to-be-determined target to be final targets, and when the weighted detection result is not greater than the preset threshold value, determining the at least one to-be-determined target to be non-final targets.

Optionally, before zoning the image to obtain the at least one image block, further includes: obtaining a height of the camera; and determining whether the height of the camera is within a preset height range.

Another aspect of the present disclosure provides a device for target detection, including: a zoning module, configured to obtain an image captured by a camera, and zone the image based on a mounting angle of the camera to obtain at least one image block; an algorithm-determining module, configured to determine target-detection algorithms for the at least one image block based on positions of the at least one image block in the image; and a detecting module, configured to perform target detection on the at least one image block based on the target-detection algorithms.

Optionally, the zoning module: determines the mounting angle of the camera is within a preset range; and when the mounting angle of the camera is within the preset range, zones the image to three rectangular blocks from top to bottom of the image, the three rectangular blocks having a same length as the image and having a width ratio of about G:H:I from top to bottom of the image, G, H, and I being positive integers and I>H>G.

Optionally, the zoning module further: determines whether the mounting angle of the camera is greater than a preset angle; and when the mounting angle of the camera is greater than the preset angle, zones the image to three rectangular blocks from top to bottom of the image, the three rectangular blocks having a same length as the image and having a width ratio of about A:B:C from top to bottom of the image, A, B, and C being positive integers and B>C>A, and when the mounting angle of the camera is not greater than the preset angle, zones the image to three rectangular blocks from top to bottom of the image, the three rectangular blocks having a same length as the image and having a width ratio of about D:E:F from top to bottom of the image, D, E, and F being positive integers and F>D>E.

Optionally, the algorithm-determining module: determines whether a distance between a geometric center of one of the at least one image block and a geometric center of the image is smaller than a preset distance; and when the distance is smaller than the preset distance, selects a multi-scale and multi-cascade based target-detection algorithm on the one of the at least image block, and when the distance is greater than the preset distance, selects applying a single-scale and single-cascade based target-detection algorithm on the one of the at least image block.

Optionally, the algorithm-determining module further categorizes the at least one image block to a plurality of types based on significance of the at least one image block such that a portion of one of the at least one image block is proportionally correlated to a significance of the one of the at least one image block.

Optionally, the algorithm-determining module further: applies one of the at least one image blocks having a greatest portion in the width ratio with a multi-scale and multi-cascade based target-detection algorithm having low speed and high precision; applies one of the at least one image block having a moderate portion in the width ratio with a multi-scale based target-detection algorithm having large-window; and applies one of the at least one image block having a smallest portion in the width ratio with a single-scale and single-cascade based target-detection algorithm having low precision and high speed.

Optionally, the detecting module: performs target detection on one of the at least one image blocks based on the target-detection algorithm applied on the image block, to obtain a detection result corresponding to at least one to-be-determined target.

Optionally, the device further includes a high precision detecting module to obtain a height of the camera and determine whether the height of the camera is within a preset height range.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

One aspect of the present disclosure provides a method for target detection. The method may be used to improve the speed of target detection in a surveillance video for conventional surveillance systems. The method may be executed by a device for target detection. The device may be implemented through software and/or hardware. The device may also be implemented through being embedded in a terminal.

Figure 1:
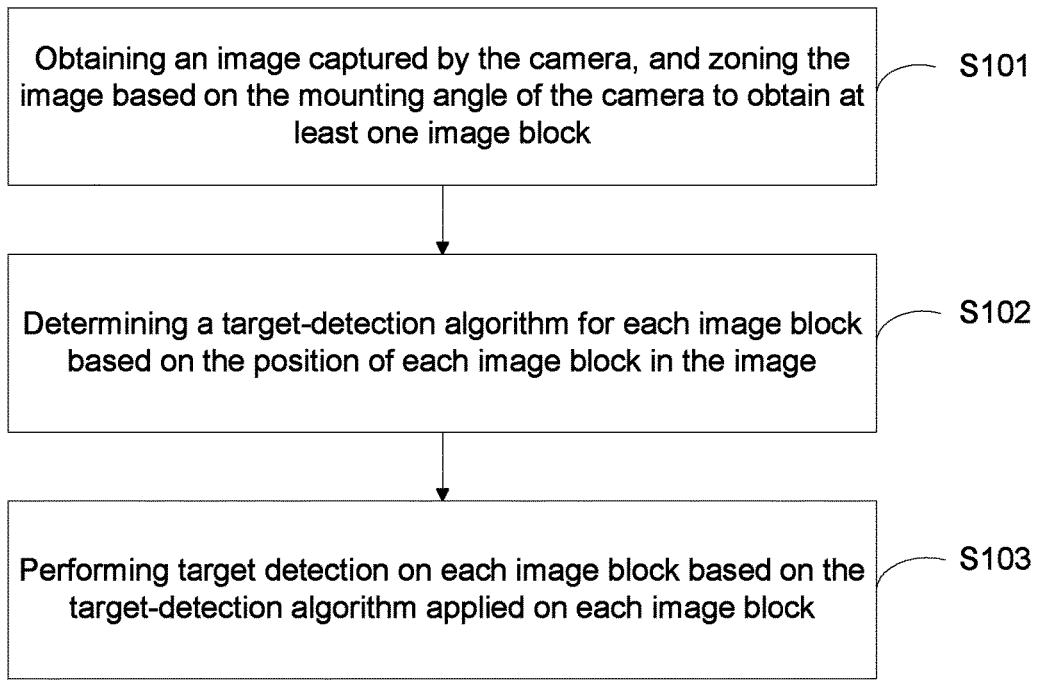
FIG. 1 illustrates an exemplary flow chart of a method for target detection consistent with various disclosed embodiments of the present disclosure.

FIG. 1 illustrates an exemplary process for target detection. As shown in FIG. 1, the process may include steps S101-S103.

In step S101, an image captured by a camera may be obtained, and the image may be zoned based on the mounting angle of the camera to obtain at least one image block.

In step S102, based on the position of each image block, a target-detection algorithm for each image block may be determined.

In step S103, based on the target-detection algorithm of each image block, target detection may be performed on each image block.

The mounting angle of the camera may be the angle between the camera and the surface normal of the ground.

Specifically, the target-detection algorithms used in the embodiments of the present disclosure may be mainly used in surveillance systems. The target-detection algorithms may be used to perform target detection in the videos filmed by the camera, to obtain abnormal targets in the surveillance area covered by the camera. To ensure a desired surveillance area to be covered by the camera, the camera is often mounted about 3-5 meters above the ground. If the camera is mounted too high, the coverage of the surveillance area may increase but the resolution of the targets in the images may be relatively low, which may adversely affect the result of target detection. If the camera is mounted too low, the coverage of the surveillance area may decrease, causing abnormal conditions in the surveillance area not being timely detected. In some embodiments, the camera may be mounted on a wall, a utility pole, and other conventional architectures. Further, to ensure surveillance effect, the mounting angle of the camera may be within a suitable range. If the mounting angle is too large, the video filmed by the camera may include an undesirably large portion of the sky, or the area captured by the camera may mainly be an area far away from the camera, resulting the resolution of a target in the images to be too low. If the mounting angle is too small, the surveillance range of the camera may be undesirably small.

In step S101, the video filmed by the camera may be obtained first, and the image of each frame in the video may be zoned based on the mounting angle of the camera. The mounting angle may refer to the angle between the camera and the surface normal of the ground. When camera is mounted at a different mounting angle, in the scenes filmed by the camera, distorted portions of an image, caused by the wide-angle camera, may have different areas/sizes. Thus, a different zoning method may be used for a different mounting angle, to obtain different image blocks.

Specifically, before step S101, i.e., before zoning the image, the method may further include obtaining the height of the camera to determine whether the height of the camera is within a preset height range. Steps S101-S103 may be executed later on.

Specifically, when zoning an image, the image may be zoned to a plurality of rectangular blocks, or a plurality of polygonal blocks. Also, based on the probability of occurrence of a target in each zone, circles, ovals, and/or other suitable patterns may be used to divide or zone the target detection zones that a target is most likely to appear.

Specifically, in step S102, a suitable target-detection algorithm may be selected for each image block based on the positions of the image blocks in the image, obtained from step S101. The target-detection algorithms for the image blocks may be different from one another or may be same. An image block located at the edge of the image may undergo certain image distortion, which affects the accuracy of the result of the target detection. Also, a target is less likely to appear at the edge of an image. Thus, when performing target detection for the image blocks on the edge of an image, target-detection algorithms with high processing speed and relatively low precision may be applied. For an image block located at the center of the image, target-detection algorithms based on multi-scale and multi-cascade classifier may be applied, to implement precise detection.

In one embodiment, when selecting target-detection algorithms, for any image block, the target-detection algorithm may be determined based on the whether the distance between the geometric center of the image block and the geometric center of the image is smaller than a preset distance. If the distance between the geometric center of the image block and the geometric center of the image is smaller than the preset distance, it may be determined that the image block is substantially at the center of the image, and the target-detection algorithm applied on the image block may be set to be a precise target-detection algorithm based on multi-scale and multi-cascade classifier. If the distance between the geometric center of the image block and the geometric center of the image is greater than the preset distance, it may be determined that the image block is on the edge of the image, and the target-detection algorithm of the image block may be set to be a target-detection algorithm with moderate precision and high processing speed and based on single-scale and single-cascade classifier.

In some embodiments, when setting a target-detection algorithm for each image block, the image blocks may be categorized to three types, e.g., three types of different significance. Based on the ranking of the significance of the image blocks, e.g., from high to low, target-detection algorithms having decreasing precision may be applied respectively on the image blocks. For example, the image block with the highest significance may be applied with an algorithm having the highest precision, and the image block with a moderate significance may be applied with an algorithm having a moderate precision. In various embodiments, the image blocks may be categorized to other numbers of types, and different target-detection algorithms may be applied on the image blocks based on the categories of the image blocks.

In some embodiments, in step S103, based on the target-detection algorithm determined for each image block in step S102, a target detection may be performed on each image block. By setting the target-detection algorithms of the image blocks, on the edge of the image, to algorithms with moderate precision and high processing speed, target detection may be faster without lowering the detection precision.

Specifically, when performing target detection on an image block, the target detection of the image block may be performed based on the target-detection algorithm set for the image block. A detection result corresponding to at least one to-be-determined target may be obtained. For a detection result corresponding to any to-be-determined target, a corrected detection result may be obtained by multiplying the detection result by a preset weight value corresponding to the image block. It may be determined whether the corrected or weighted detection result is greater than a preset threshold value. If it is determined that the corrected detection result is greater than the preset threshold value, the to-be-determined target may be determined to be a final target. If it is determined that the corrected detection result is not greater than the preset threshold value, the to-be-determined target may be determined to be a non-final target.

When performing target detection on an image block, because the camera is arranged to be above the ground, the camera may capture targets in different image blocks. The targets may occupy or correspond to different numbers of pixels, and thus different threshold values may be used to determine different to-be-determined targets. Thus, in some embodiments, detection results corresponding to different to-be-determined targets may be multiplied by different preset weight values to obtain more accurate target determining results.

According to the method for target detection provided by the present disclosure, an image may be zoned to a plurality of image blocks. Based on different positions of the image blocks, in the image, target-detection algorithms with different scaling factors, detection precision, and/or processing speed may be determined for different image blocks. The target-detection algorithms for image blocks located on the edge of the image may be set to have moderate precision and high processing speed. Thus, without sacrificing/lowering detection precision, the speed of target detection may be improved.

The zoning of images used for disclosed embodiments may now be described in detail. Specifically, when zoning an image, the following two possible ways may be used.

In one embodiment, an image captured by the camera may be obtained, and it may be determined whether the mounting angle of the camera is in a preset range. If it is determined that the mounting angle of the camera is in the preset range, the image may be zoned into three rectangular blocks, from the top to the bottom of the image. The length of each rectangular block may be the length of the image, e.g., along the horizontal direction. The widths of the rectangular blocks may have a ratio or width ratio of, from top to bottom, G:H:I, where G, H, and I may be positive integers and I>H>G.

Figure 2:
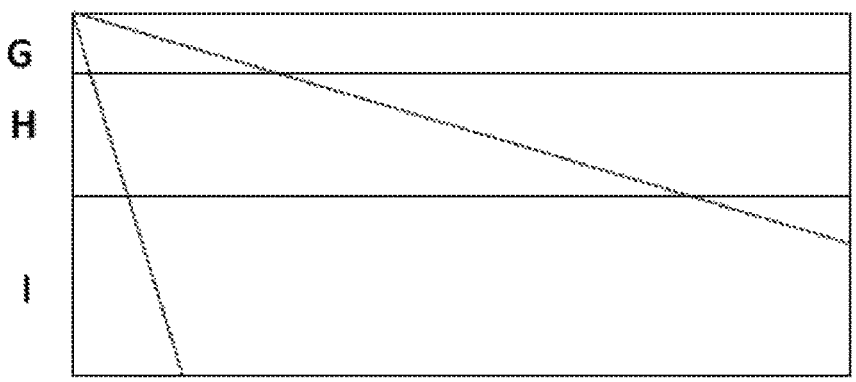
FIG. 2 illustrates an exemplary image zoning process of a method for target detection consistent with various disclosed embodiments of the present disclosure.

FIG. 2 illustrates exemplary zoned image used in the disclosed method for target detection. Often, the mounting angle of the camera may be in the range of about 35 degrees to about 50 degrees. When the mounting angle exceeds this range, the probability for a surveillance video to capture a target may be significantly decreased, and the probability to precisely detect targets through target detection on the images captured by the camera may be significantly decreased accordingly. When it is detected that the mounting angle of the camera is within the preset range, the wide-angle effect of the camera may be taken into account, and the image captured by the camera may be zoned into the image blocks illustrated in FIG. 2 based on whether the image has undergone distortion. The image blocks formed from zoning the image are shown in dashed lines in FIG. 2. The probability that a target appears on the upper right portion and the lower left portion of the image may be sufficiently low and, because of distortion, the accuracy of the detection result for the upper right portion and the lower left portion of the image may be low. Thus, as shown in FIG. 2, indicated by the solid lines, the image may be proportionally zoned into three rectangular image blocks from top to bottom. The length of each rectangular block may be the length of the image, e.g., along the horizontal direction. The widths of the rectangular blocks may have a ratio or width ratio of, from top to bottom, G:H:I. In one embodiment, the ratio of G:H:I may be about 1:2:3.

Figure 3:
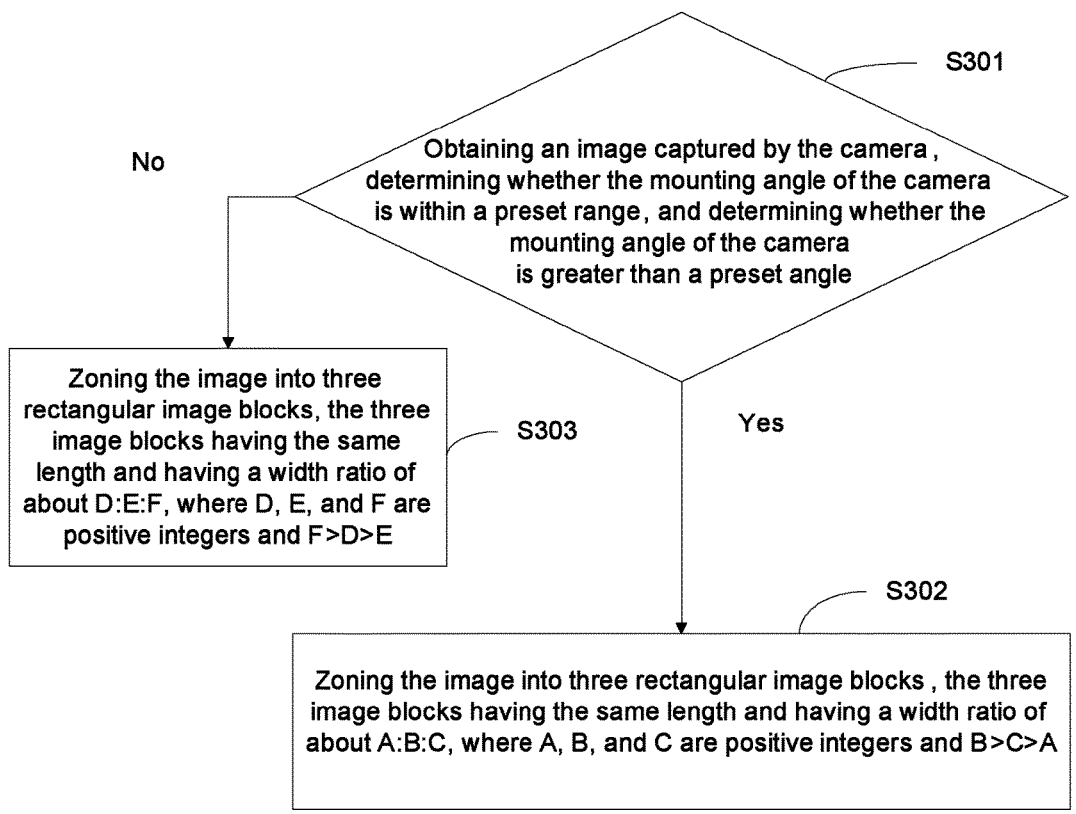
FIG. 3 illustrates another exemplary flow chart of a method for target detection consistent with various disclosed embodiments of the present disclosure.

FIG. 3 illustrates another exemplary flow chart of the disclosed method for target detection. As shown in FIG. 3, the process may include steps S301-S303.

In step S301, an image captured by the camera may be obtained, and it may be determined that whether the mounting angle of the camera is within a preset range and whether the mounting angle of the camera is greater than a preset angle. If it is determined that the mounting angle of the camera is greater than the preset angle, the process may proceed to step S302. If it is determined that the mounting angle of the camera is smaller than the preset angle, the process may proceed to step S303.

In step S302, the image may be zoned into three rectangular image blocks, and a width ratio of the image blocks may be A:B:C from top to bottom of the image, where A, B, C may be positive integers and B>C>A.

In step S303, the image may be zoned into three rectangular image blocks, a width ratio of the image blocks being D:E:F from top to bottom of the image, where D, E, F may be positive integers and F>D>E.

Specifically, to obtain an optimized zoning result, in step S301, it may first be determined that whether the mounting angle of the camera is in the preset range, and it may further be determined whether the mounting angle of the camera is greater than the a preset angle. In some embodiments, the preset angle may be about 45 degrees.

Figure 4:
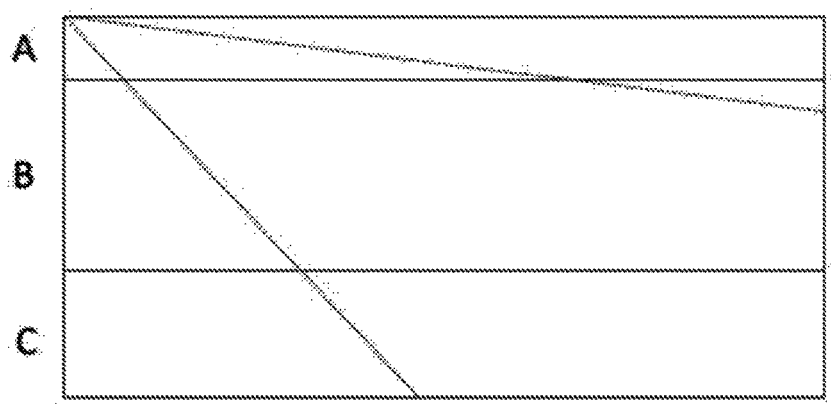
FIG. 4 illustrates another exemplary image zoning process of a method for target detection consistent with various disclosed embodiments of the present disclosure.
Figure 5:
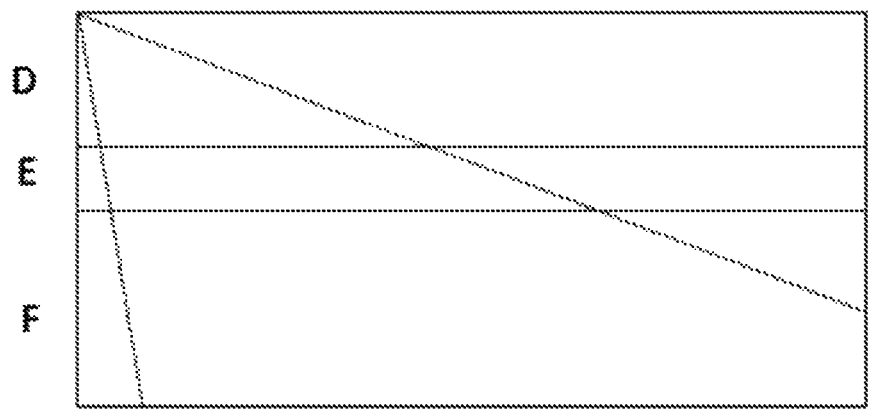
FIG. 5 illustrates another exemplary image zoning process of a method for target detection consistent with various disclosed embodiments of the present disclosure.

FIG. 4 illustrates another exemplary zoned image according to the disclosed method for target detection. FIG. 5 illustrates another exemplary zoned image according to the disclosed method for target detection. In step S302, when the mounting angle is greater than 45 degrees, the main image range captured by the camera may be indicated by the dashed lines in FIG. 4. The portion of the image without distortion may be located mainly at the center of the image, and the image may be zoned into three rectangular image blocks using the zoning process illustrated in FIG. 2, the width ratio of A:B:C may be about 1:3:2. In step S303, when the mounting angle is smaller than 45 degrees, the main image range captured by the camera may be indicated by the dashed lines in FIG. 5. The portion of the image without distortion may be located mainly at the bottom of the image, and the width ratio of D:E:F may be set to be about 2:1:3.

When an image is zoned to three image blocks according to the zoning processes illustrated in FIGS. 2 and 4, three different target-detection algorithms may be used to detect the image. Image blocks I, B, and F, being the greatest portions in the corresponding width ratio, may be applied with a target-detection algorithm with high precision, low speed, and based on multi-scale and multi-cascade classifier. Image blocks H, C, and D may be applied with a target-detection algorithm with moderate speed and based on large-window. Image blocks G, A, and E, being the smallest in the corresponding width ratio, may be applied with a target-detection algorithm with low precision, high speed, and based on single-scale and single-cascade classifier.

In some embodiments, an image block having the highest significance may be zoned to have the greatest portion in the corresponding width ratio, e.g., image blocks I, B, and F; an image block having a moderate significance may be zoned to have a moderate portion in the corresponding width ratio, e.g., image blocks H, C, and D; and an image block having a lowest significance may be zoned to have a smallest portion in the corresponding width ratio, e.g., image blocks G, A, and E. That is, the portion of an image block in the corresponding width ratio may be proportionally correlated to the significance of the image block. Accordingly, an image having the highest significance or having the highest portion in the corresponding width ratio may be applied with a target-detection algorithm having a highest precision and low speed, and based on multi-scale and multi-cascade classifier; an image having a moderate significance or having a moderate portion in the corresponding width ratio may be applied with a target-detection algorithm having large-window and moderate speed, and based on multi-scale classifier; and an image having the lowest significance or having the smallest portion in the corresponding width ratio may be applied with a target-detection algorithm having a lowest precision and high speed, and based on single-scale and single-cascade classifier.

In some embodiments, it should be known to those skilled in the art that, other suitable zoning processes may also be used when zoning an image, and an image may also be zoned to other numbers of image blocks. For different image blocks, other detection scaling factors and target-detection algorithms may also be used. The specific zoning process, scaling factor, and detection algorithm used for target detection should not be limited by the embodiments of the present disclosure.

Figure 6:
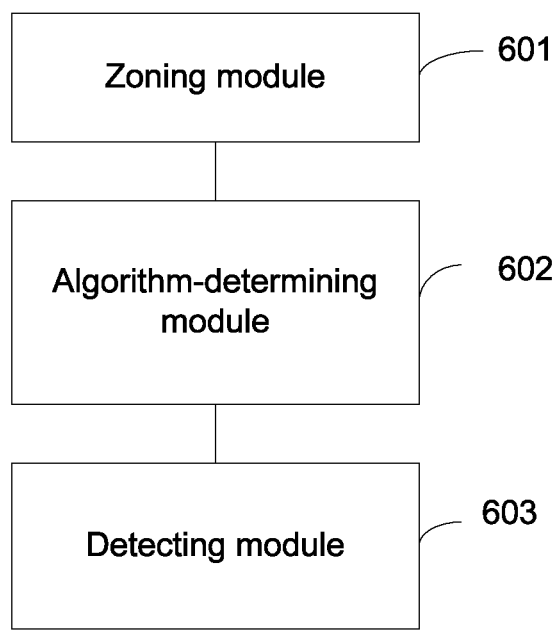
FIG. 6 illustrates an exemplary device for target detection consistent with various disclosed embodiments of the present disclosure.

Another aspect of the present disclosure further includes a device for target detection, to implement the disclosed method for target detection. FIG. 6 illustrates an exemplary device for target detection. As shown in FIG. 6, the device may include a zoning module 601, an algorithm-determining module 602, and a detecting module 603.

The zoning module 601 may be configured to obtain an image captured by the camera, and zone the image based on the mounting angle of the camera to obtain at least one image block. The mounting angle of the camera may be the angle between the camera and the surface normal of the ground.

The algorithm-determining module 602 may be configured to determine the target-detection algorithm applied on each image block based on the position of the image block in the image.

The detecting module 603 may be configured to perform target detection on each image block based on the target-detection algorithm applied on each image block.

In some embodiments, the zoning module 601 may be configured to obtain an image captured by the camera and determine whether the mounting angle of the camera is within the preset range. If it is determined that the mounting angle of the camera is within the preset range, the image may be zoned into three rectangular image blocks from top to bottom of the image. The three rectangular image blocks may have the same length, and the width ratio of the three rectangular image blocks may be about G:H:I, where G, H, and I may be positive integers and I>H>G.

In some other embodiments, the zoning module 601 may be configured to obtain an image captured by the camera and determine whether the mounting angle of the camera is within the preset range and whether the mounting angle of the camera is greater than a preset angle. If it is determined that the mounting angle of the camera is within the preset range and the mounting angle of the camera is greater than a preset angle, the image may be zoned into three rectangular image blocks from top to bottom of the image. The three rectangular image blocks may have the same length, and the width ratio of the three rectangular image blocks may be about A:B:C, where A, B, and C may be positive integers and B>C>A. If it is determined that the mounting angle of the camera is not within the preset range or the mounting angle of the camera is not greater than a preset angle, the image may be zoned into three rectangular image blocks from top to bottom of the image. The three rectangular image blocks may have the same length, and the width ratio of the three rectangular image blocks may be about D:E:F, where D, E, and F may be positive integers and F>D>E.

In some embodiments, the algorithm-determining module 602 may be configured to determine whether the distance between the geometric center of any image block and the geometric center of the image is smaller than a preset distance. If it is determined that the distance between the geometric center of any image block and the geometric center of the image is smaller than the preset distance, the target-detection algorithm applied on the image block may be determined to be an algorithm based on multi-scale and multi-cascade classifier. If it is determined that the distance between the geometric center of any image block and the geometric center of the image is greater than the preset distance, the target-detection algorithm applied on the image block may be determined to be an algorithm based on single-scale and single-cascade classifier.

In some embodiments, the detecting module 603 may be configured to perform target detection on any one of the image blocks based on the target-detection algorithm applied on the image block, to obtain a detection result corresponding to at least one to-be-determined target. For any detection result corresponding to a to-be-determined target, the detecting module 603 may multiply the detection result by a corresponding preset weight value to obtain the corrected detection result. Further, the detecting module 603 may determine whether the corrected detection result is greater than a preset threshold value. If it is determined that the corrected detection result is greater than the preset threshold value, the to-be-determined target may be determined to be the final target. If it is determined that the corrected detection result is not greater than the preset threshold value, the to-be-determined target may be determined to be the non-final target.

In some embodiments, the device for target detection may further include a high precision detecting module, configured to obtain the height of the camera and determine whether the height of the camera is within the preset height range.

In some embodiments, the camera may be mounted with various lighting devices to provide sufficient lighting for the monitored area. Depending on how the lighting devices are mounted or arranged, certain portions of the collected image may correspond to the monitored areas that are well-lit or not so well-lit. The detecting module 603 may adjusting a corresponding preset weight value to obtain the corrected detection result. For example, an image block corresponds to a well-lit area may be assigned a higher weight factor.

According to the device for target detection provided by the present disclosure, the zoning module may zone/divide the image into a plurality of image blocks, and the algorithm-determining module may set target-detection algorithms with different scaling factors, detection precision, and processing speed for the image blocks based on the different locations of image blocks. The target-detection algorithm for an image block at the edge of the image may be applied with an algorithm having moderate precision and relatively high processing speed. Thus, without sacrificing detection precision, the speed of target detection may be improved.

Figure 7:
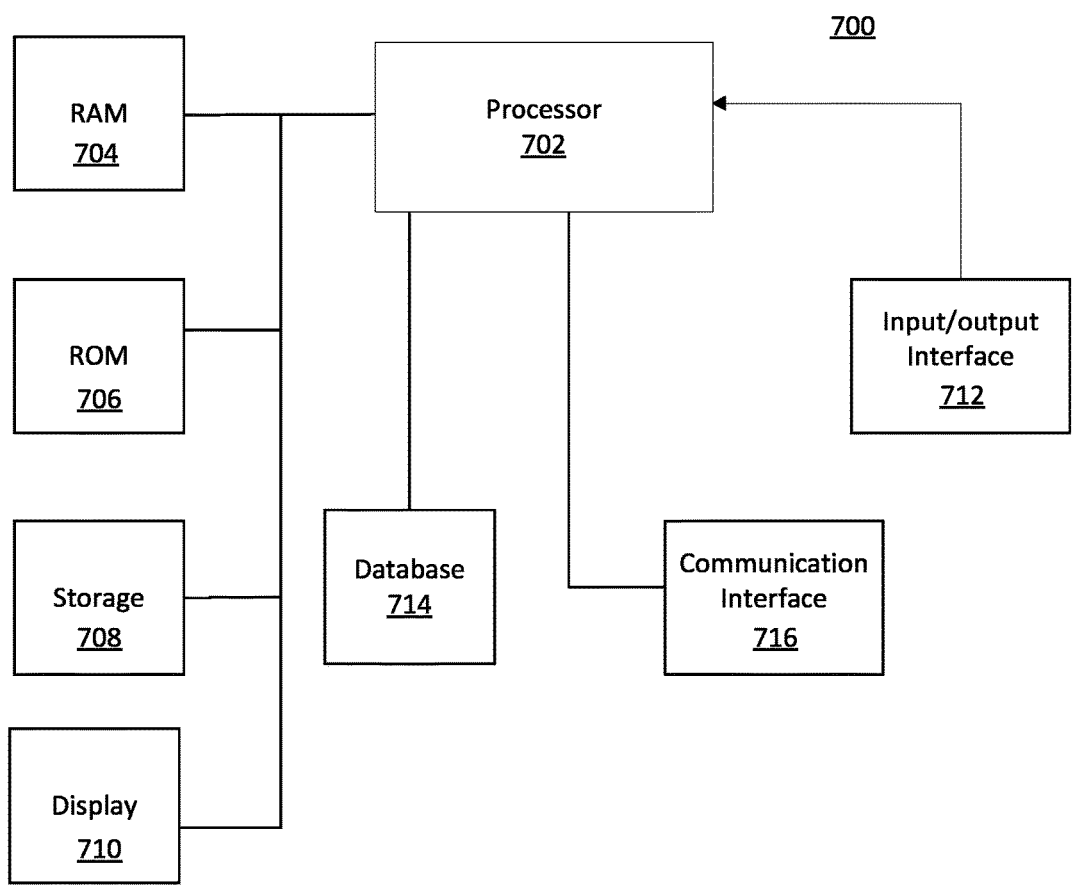
FIG. 7 illustrates a block diagram of a control unit used in various disclosed embodiments of the present disclosure.

FIG. 7 illustrates the block diagram of a control unit 700 used in various embodiments of the present disclosure. The control unit 700 may be integrated with in the camera for target detection or may be an external part coupled to the camera. The control unit 700 may be configured to provide software and hardware base for the disclosed device, and execute the functions implemented by the modules of the device. For example, the control unit 700 may be configured to implement functions of the zoning module 601, the algorithm-determining module 602, and the detecting module 603.

The control unit 700 may receive, process, and execute commands from the display apparatus. The control unit 700 may include any appropriately configured computer system. As shown in FIG. 12, control unit 700 may include a processor 702, a random access memory (RAM) 704, a read-only memory (ROM) 706, a storage 708, a display 710, an input/output interface 712, a database 714; and a communication interface 716. Other components may be added and certain devices may be removed without departing from the principles of the disclosed embodiments.

Processor 702 may include any appropriate type of general purpose microprocessor, digital signal processor or microcontroller, and application specific integrated circuit (ASIC). Processor 702 may execute sequences of computer program instructions to perform various processes associated with control unit 700. Computer program instructions may be loaded into RAM 704 for execution by processor 702 from read-only memory 706, or from storage 708. Storage 708 may include any appropriate type of mass storage provided to store any type of information that processor 702 may need to perform the processes. For example, storage 708 may include one or more hard disk devices, optical disk devices, flash disks, or other storage devices to provide storage space. In some embodiments, the storage 708 may be the storage of the camera.

Display 710 may provide information to a user or users of the control unit 700. Display 710 may include any appropriate type of computer display device or electronic device display (e.g., CRT or LCD based devices). Input/output interface 712 may be provided for users to input information into control unit 700 or for the users to receive information from control unit 700. For example, input/output interface 712 may include any appropriate input device, such as a keyboard, a mouse, an electronic tablet, voice communication devices, touch screens, or any other optical or wireless input devices. Further, input/output interface 712 may receive from and/or send to other external devices.

Further, database 714 may include any type of commercial or customized database, and may also include analysis tools for analyzing the information in the databases. Database 714 may be used for storing data, e.g., certain parameters, for related computation in target detection. Communication interface 716 may provide communication connections such that control unit 700 may be accessed remotely and/or communicate with other systems through computer networks or other communication networks via various communication protocols, such as transmission control protocol/internet protocol (TCP/IP), hyper text transfer protocol (HTTP), etc.

In one embodiment. the processor 702 may obtain an image captured by the camera from the storage 708 and store it in RAM 704 for processing, and determine whether the mounting angle of the camera is within a preset range. The data regarding the mounting angle of the camera may be stored in the storage 708. The processor 702 may compare the mounting angle with the preset angle stored in the database 714 to determine whether the mounting angle exceeds the preset angle. If it is determined that the mounting angle exceeds the preset angle, the processor 702 may zone the image into three rectangular image blocks, from top to bottom of the image. The three image blocks may have the same length and have a width ratio of about A:B:C, where A, B, and C are positive integers and B>C>A. If it determined that the mounting angle is smaller than the preset angle, the processor 702 may zone the image into three rectangular image blocks, from top to bottom of the image. The three image blocks may have the same length and have a width ratio of about D:E:F, where D, E, and F are positive integers and F>D>E.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the method for target detection provided by the present disclosure, an image may be zoned to a plurality of image blocks. Based on different positions of the image blocks, in the image, target-detection algorithms with different scaling factors, detection precision, and/or processing speed may be determined for different image blocks. The target-detection algorithms for image blocks located on the edge of the image may be set to have moderate precision and high processing speed. Thus, without sacrificing/lowering detection precision, the speed of target detection may be improved.

Further, by using the device for target detection provided by the present disclosure, the zoning module may zone/divide the image into a plurality of image blocks, and the algorithm-determining module may set target-detection algorithms with different scaling factors, detection precision, and processing speed for the image blocks based on the different locations of image blocks. The target-detection algorithm for an image block at the edge of the image may be applied with an algorithm having moderate precision and relatively high processing speed. Thus, without sacrificing detection precision, the speed of target detection may be improved.

REFERENCE SIGN LIST

Zoning module 601
Algorithm-determining module 602
Detecting module 603
Control unit 700
Processor 702
RAM 704
ROM 706
Storage 708
Display 710
Input/output interface 712
Database 714
Communication interface 716

What is claimed is:

1. A method for target detection, comprising:
    obtaining an image captured by a camera, and zoning the image based on a mounting angle of the camera to obtain at least one image block;
    determining target-detection algorithms for the at least one image block based on positions of the at least one image block in the image, comprising:
        determining whether a distance between a geometric center of one of the at least one image block and a geometric center of the image is smaller than a preset distance;
        when the distance is smaller than the preset distance, selecting applying a multi-scale and multi-cascade based target-detection algorithm on the one of the at least image block, and when the distance is greater than the preset distance, selecting applying a single-scale and single-cascade based target-detection algorithm on the one of the at least image block; and performing target detection on the at least one image block based on the target-detection algorithms.

2. The method according to claim 1, wherein:

determining target-detection algorithms for the at least one image block based on positions of the at least one image block in the image includes determining a target-detection algorithm for each one of the at least one image block based on a position of each one of the at least one image block in the image; and performing target detection on the at least one image block based on the target-detection algorithms includes performing a target detection on each one of the at least one image block based on the target-detection algorithm applied on each one of the at least one image block.

3. The method according to claim 1, wherein zoning the image based on a mounting angle of the camera to obtain at least one image block includes:

determining the mounting angle of the camera is within a preset range; and when mounting angle of the camera is within the preset range, zoning the image to three rectangular blocks from top to bottom of the image, the three rectangular blocks having a same length as the image and having a width ratio of about G:H:I from top to bottom of the image, G, H, and I being positive integers and I>H>G.

4. The method according to claim 3, further including:

determining whether the mounting angle of the camera is greater than a preset angle; and when the mounting angle of the camera is greater than the preset angle, zoning the image to three rectangular blocks from top to bottom of the image, the three rectangular blocks having a same length as the image and having a width ratio of about A:B:C from top to bottom of the image, A, B, and C being positive integers and B>C>A, and when the mounting angle of the camera is not greater than the preset angle, zoning the image to three rectangular blocks from top to bottom of the image, the three rectangular blocks having a same length as the image and having a width ratio of about D:E:F from top to bottom of the image, D, E, and F being positive integers and F>D>E.

5. The method according to claim 1, wherein the at least one image block is categorized to a plurality of types based on significance of the at least one image block such that a portion of one of the at least one image block is proportionally correlated to a significance of the one of the at least one image block.

6. The method according to claim 5, wherein one of the at least one image blocks having a greatest portion in the width ratio is applied with a multi-scale and multi-cascade based target-detection algorithm having low speed and high precision; one of the at least one image block having a moderate portion in the width ratio is applied with a multi-scale based target-detection algorithm having large-window; and one of the at least one image block having a smallest portion in the width ratio is applied with a single-scale and single-cascade based target-detection algorithm having low precision and high speed.

7. The method according to claim 1, wherein performing target detection on the at least one image block based on the target-detection algorithms includes:

performing target detection on one of the at least one image block based on the target algorithm to obtain a detection result of at least one to-be-determined target;

multiplying the detection result by a corresponding weight value to obtain a weighted detection result; and determining whether the weighted detection result is greater than a preset threshold value, when the weighted detection result is greater than the preset threshold value, determining the at least one to-be-determined target to be final targets, and when the weighted detection result is not greater than the preset threshold value, determining the at least one to-be-determined target to be non-final targets.

8. The method according to claim 1, wherein before zoning the image to obtain the at least one image block, further includes:

obtaining a height of the camera; and determining whether the height of the camera is within a preset height range.

9. A device for target detection, comprising: a memory and a processor coupled to the memory, the processor being configured to:

obtain an image captured by a camera, and zone the image based on a mounting angle of the camera to obtain at least one image block;

determine target-detection algorithms for the at least one image block based on positions of the at least one image block in the image, comprising:

determining whether a distance between a geometric center of one of the at least one image block and a geometric center of the image is smaller than a preset distance;

when the distance is smaller than the preset distance, selecting applying a multi-scale and multi-cascade based target-detection algorithm on the one of the at least image block, and when the distance is greater than the preset distance, selecting applying a single-scale and single-cascade based target-detection algorithm on the one of the at least image block; and perform target detection on the at least one image block based on the target-detection algorithms.

10. The device according to claim 9, wherein the processor is further configured to:

determine the mounting angle of the camera is within a preset range; and when the mounting angle of the camera is within the preset range, zone the image to three rectangular blocks from top to bottom of the image, the three rectangular blocks having a same length as the image and having a width ratio of about G:H:I from top to bottom of the image, G, H, and I being positive integers and I>H>G.

11. The device according to claim 10, wherein the processor is further configured to:

determine whether the mounting angle of the camera is greater than a preset angle; and when the mounting angle of the camera is greater than the preset angle, zone the image to three rectangular blocks from top to bottom of the image, the three rectangular blocks having a same length as the image and having a width ratio of about A:B:C from top to bottom of the image, A, B, and C being positive integers and B>C>A, and when the mounting angle of the camera is not greater than the preset angle, zone the image to three rectangular blocks from top to bottom of the image, the three rectangular blocks having a same length as the image and having a width ratio of about D:E:F from top to bottom of the image, D, E, and F being positive integers and F>D>E.

12. The device according to claim 9, wherein the processor is further configured to:
   categorize the at least one image block to a plurality of types based on significance of the at least one image block such that a portion of one of the at least one image block is proportionally correlated to a significance of the one of the at least one image block.

13. The device according to claim 12, wherein the processor is further configured to:
   apply one of the at least one image blocks having a greatest portion in the width ratio with a multi-scale and multi-cascade based target-detection algorithm having low speed and high precision;
   apply one of the at least one image block having a moderate portion in the width ratio with a multi-scale based target-detection algorithm having large-window; and
   apply one of the at least one image block having a smallest portion in the width ratio with a single-scale and single-cascade based target-detection algorithm having low precision and high speed.

14. The device according to claim 9, wherein the processor is further configured to:

perform target detection on one of the at least one image blocks based on the target-detection algorithm applied on the image block, to obtain a detection result corresponding to at least one to-be-determined target.

15. The device according to claim 9, wherein the processor is further configured to obtain a height of the camera and determine whether the height of the camera is within a preset height range.

* * * * *